United States Patent
Baxter et al.

(10) Patent No.: US 7,107,356 B2
(45) Date of Patent: Sep. 12, 2006

(54) TRANSLATOR FOR ENABLING LOGICAL PARTITIONING OF A NETWORK SWITCH

(75) Inventors: Leslie A. Baxter, Little Silver, NJ (US); Mark S. Larkin, Manasquan, NJ (US); Eric S. Tentarelli, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 793 days.

(21) Appl. No.: 10/081,311

(22) Filed: Feb. 21, 2002

(65) Prior Publication Data
US 2002/0129166 A1  Sep. 12, 2002

Related U.S. Application Data

(60) Provisional application No. 60/274,009, filed on Mar. 7, 2001.

(51) Int. Cl.
*G06F 15/16* (2006.01)
(52) U.S. Cl. .................. 709/245; 709/223; 709/238
(58) Field of Classification Search ............ 709/245, 709/223, 238, 409
See application file for complete search history.

(56) References Cited

U.S. PATENT DOCUMENTS

| | | | |
|---|---|---|---|
| 4,816,826 A * | 3/1989 | Munter et al. | 340/825.52 |
| 5,550,816 A * | 8/1996 | Hardwick et al. | 370/397 |
| 5,764,955 A * | 6/1998 | Doolan | 709/223 |
| 6,457,003 B1 * | 9/2002 | Gajda et al. | 707/4 |
| 6,587,469 B1 * | 7/2003 | Bragg | 370/401 |
| 6,594,704 B1 * | 7/2003 | Birenback et al. | 709/238 |
| 6,674,756 B1 * | 1/2004 | Rao et al. | 370/395.21 |
| 6,687,220 B1 * | 2/2004 | Ayres | 370/229 |
| 6,738,828 B1 * | 5/2004 | Keats et al. | 709/245 |

OTHER PUBLICATIONS

Dowling, Conor; "Here To Stay"; Sep. 1, 1997; p. 34.*
Man, Fu-Tin; A Brief History of TL1; Jun. 1, 1999; p. 143.*

* cited by examiner

*Primary Examiner*—Ario Etienne
*Assistant Examiner*—Lashonda Jacobs

(57) ABSTRACT

A method for translating control messages between a network manager and a router. The method includes intercepting an input command message intended for the router, where the router partitioned into a plurality of logical router partitions, and the input command message expressed in terms of logical router partitions. Each logical router partition expression of the input command message is translated into a physical router expression, and the input command message, including any translated expressions, is propagated toward the router.

20 Claims, 6 Drawing Sheets

TRANSLATOR FOR ENABLING LOGICAL PARTITIONING OF A NETWORK SWITCH

CROSS-REFERENCES

This application claims the benefit of U.S. Provisional Application Ser. No. 60/274,009, filed Mar. 7, 2001, which is herein incorporated by reference in its entirety.

TECHNICAL FIELD

The present invention relates to optical virtual private networks and, more particularly, to a translator that enables an interface between a network manager and many network elements using a single network switch.

BACKGROUND OF THE INVENTION

As demand for transferring electronic data grows, major global carriers seek city-to-city connectivity in their global data networks. The hardware for implementing this and other network connectivity includes computer and networking equipment. Furthermore, the communications industry is rapidly moving to fiber optic mediums, which are faster than conventional copper wired mediums. As with most new technologies, the fiber optic mediums are expensive to procure.

For example, a global carrier may provide network connectivity between the cities of New York City, Los Angeles, Seattle, Tokyo, and Osaka. In this instance, each city requires computer and networking equipment, such as servers and routers (i.e., switches). In this instance, a total of five optical routers would be required to provide connectivity between all five cities.

As more cities are connected to the global data network, additional infra-structure and intra-structure is required. In particular, an additional optical router is required for each location added to the global network, which drives up the purchasing expenses for the global carrier.

SUMMARY OF THE INVENTION

Other and further aspects of the present invention will become apparent during the course of the following description by reference to the accompanying drawing. In particular, the present invention includes a method and apparatus for routing control messages between a network manager and a single router to control connectivity between at least two network elements through the single router.

A method and apparatus according to one embodiment comprises a translator, which intercepts an input command message intended for the router, where the router is partitioned into a plurality of logical router partitions, and the input command message is expressed in terms of the logical router partitions. Each logical router partition of the input command message is translated into a physical router expression, and the translated input command message, including any translated expressions, is then propagated toward the router.

In response to the input command message, the router provides a return message (e.g., command response message or acknowledgement) to the network manager. The translator intercepts the return message from the router, where the return message is expressed in terms of the physical router. The translator translates the physical router expression of the return message into a logical router partition, and then propagates the translated return message toward the network manager.

BRIEF DESCRIPTION OF THE DRAWING

FIG. 1 depicts a block diagram of a communications network having a network manager-to-router translator program of the present invention;

FIG. 2 depicts a block diagram of a host computer facilitating the translator program in the communications network of FIG. 1;

FIG. 3 depicts a block diagram of the router suitable for use in the network of FIG. 1;

FIG. 4 depicts a block diagram of a plurality of program modules of a translator program;

FIG. 5 depicts a flow diagram of a method of exchanging and translating TL1 input command and return messages between a network manager and a logically partitioned router using a translator program; and FIG. 6 depicts a flow diagram of a method of exchanging and translating TL1 autonomous messages between the logically partitioned router and network manager via the translator program.

To facilitate understanding, identical reference numerals have been used, where possible, to designate identical elements that are common to the figures.

DETAILED DESCRIPTION

The present invention relates to a method and apparatus for using a single router in a network and logically defining the router as multiple routers from the perspective of networking management software. Specifically, a translator program, according to an embodiment of the present invention, is utilized to partition and map a single optical router to function as multiple independent routers in a communications network for routing transaction language messages between a network manager and the router. The translator program operates in tandem with, or as part of, an operating system on a host computer device interfacing between the network manager and the single partitioned router. The transaction language messages are administrative commands generated by an administrator of the network manager to illustratively, establish a connection between at least two external nodes (i.e., network elements) coupled together through the single router. Once the network element connections in the router are established, the single router is capable of routing data (e.g., video data) therebetween.

As described in detail herein, aspects of the preferred embodiment pertain to specific method steps that are implemented on computer systems. In one embodiment, the invention may be implemented as a computer software product for use with a computer system. The programs of the software product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention. Alternate embodiments may include implementation of the inventive translator software program as an application program stored on the computer, as program code stored in a device driver or on an output device itself, or on a network device such as a server or firewall, as discussed in further detail below.

Figure 1:
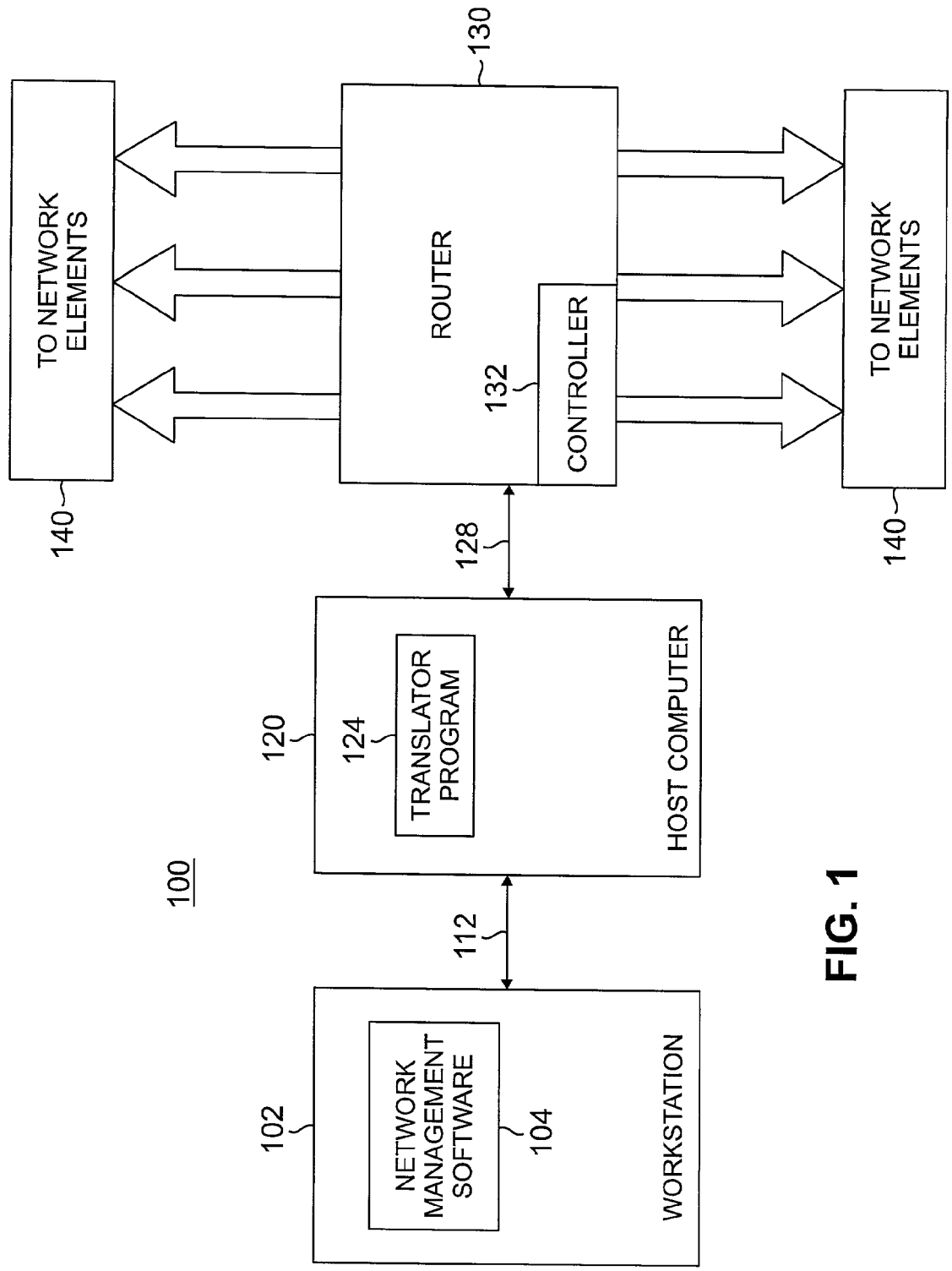

FIG. 1 depicts a block diagram of a communications network 100 having a single router 130 and a translator program 124 according to the present invention. In one embodiment, the communications network 100 comprises a workstation 102 for hosting a network manager 104, a host computer 120 for hosting a translator program 124, and a single router 130, which is coupled between a plurality of network elements 140. The workstation 102 is networked to the host computer 120, illustratively, through Ethernet wiring 112. The host computer 120 is similarly coupled to the router 130, illustratively, through Ethernet wiring 128. Alternately, the host computer 120 may communicate between the workstation 102 and router 130 through a wireless communications standard, illustratively, operating under the "Bluetooth", IEEE 802.11 family standards, Open Air industry standards, Shared Wireless Access Protocol (SWAP), and HiperLAN family standards, which are hereby incorporated by reference herein. For example, both the Bluetooth and the 802.11 standards provide for wireless technology that supports both point-to-point and point-to-multipoint connections. The router 130 is coupled between various network elements 140 to route data traffic between like and unlike local/wide area networks (LAN/WAN).

The network manager may be the WAVESTAR™ optical service manager (hereinafter "network manager"), manufactured by Lucent Technologies, Inc., of Murray Hill, N.J., which manages the connectivity between the various nodes and network elements 140. The router 130 may be Lucent's LAMBDAROUTER™ all optical switch (hereinafter "router"), which comprises micro electro-mechanical systems (MEMS) that steer light from an input port to a particular output port. The translator program 124 may be implemented as, for example, a software tool that intercepts and modifies particular information that is exchanged between the network manager 104 and the router 130 in order to "trick" the network manager 104 to see multiple routers 130.

Figure 2:
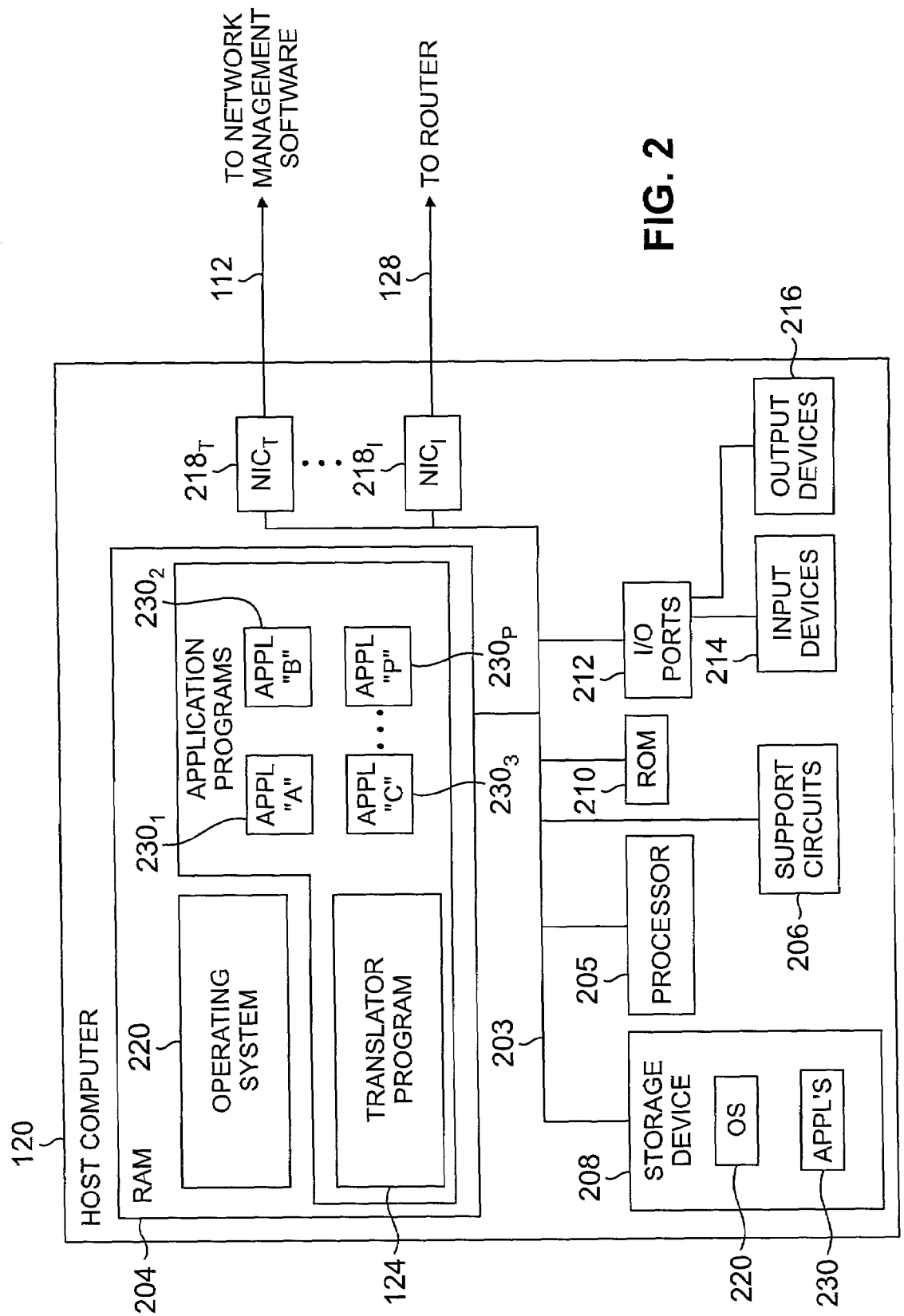

FIG. 2 depicts a block diagram of an exemplary host computer 120, which is coupled between the workstation 102 and router 130 of FIG. 1. Although FIG. 2 is depicted and described in terms of the host computer 120, it should be understood that the workstation 102 also comprises similar components and software thereof. For example, in one embodiment, the workstation 102 comprises Microsoft's WINDOWS® operating systems (e.g., Windows NT®), which is capable of providing graphical user interfaces (GUI) for user interaction.

Referring to FIG. 2, the host computer 120 comprises at least one system interconnect, e.g., bus 203, to which various components are coupled and communicate with each other. Specifically, a processor 205, storage device 208, memory such as random access memory (RAM) 204, read only memory (ROM) 210, input/output (I/O) ports 212, and other support circuits 206 (e.g., power supplies, clocks, bus controllers, graphics display, and the like) are coupled to the system bus 203. Furthermore, one or more output devices 216, such as a display, as well as one or more input devices 214 such as a keyboard and/or pointing device are respectively coupled to the I/O ports 212. The input and output devices 214 and 216 permit user interaction with the host computer 120. Additional input/output devices include one or more network interface cards (NIC) $218_1$ through $218_r$ (collectively network interface cards 218). The NICs 218 provide connectivity to the one or more communications networks such as the LAN/WAN 112. In FIG. 2, the first and second NICs are, illustratively, ETHERNET® adapter card.

The RAM 204 is volatile memory (e.g., SRAM, DRAM, and the like). The contents of the RAM 204 may be retrieved from the storage device 208 as required. Illustratively, the RAM 204 is shown with the operating system 220 and application programs 230 "A" through "P" concurrently stored therein. The program code of the operating system 220 and/or application programs 230 is sent to the RAM 204 from ROM 208 for temporary storage and subsequent execution by the processor 205.

The operating system (OS) 220 may illustratively be any one of IBM's operating systems (e.g., OS/400) or Microsoft's WINDOWS® operating systems (e.g., Windows NT®), or any other operating system 220 that provides graphical user interfaces (GUI) for user interaction (e.g., the Apple® systems). In one embodiment, the operating system 220 is a Linux based operating system. The operating system 220 is capable of interfacing with all of the hardware components of the host computer 120.

The applications programs 230 are specialized programs, such as anti-virus programs, web browsers, and the like. Executable and library files (not shown) of the operating system 220 and application programs 230 are individually transferred from the storage device 208 to the RAM 204 for processing as needed. The transfer of the executable files may be controlled by a memory management system such as on-demand paging. Thus, the RAM 204 is capable of storing files from the operating system 220, as well as files from one or more applications programs $230_1$ through $230_p$ (collectively applications programs 230).

Referring to FIG. 1, the translator program 124 of the present invention is stored at the host computer 120 for interfacing between the network manager 104 in the workstation 102 and a controller 132 on the router 130. For purposes of clarity and understanding the invention, the translator program 124 is discussed as being a separate application program 230. The translator program 124 may be loaded into the RAM 204 upon user activation of such application program or automatically during boot-up of the host computer 120.

Figure 3:
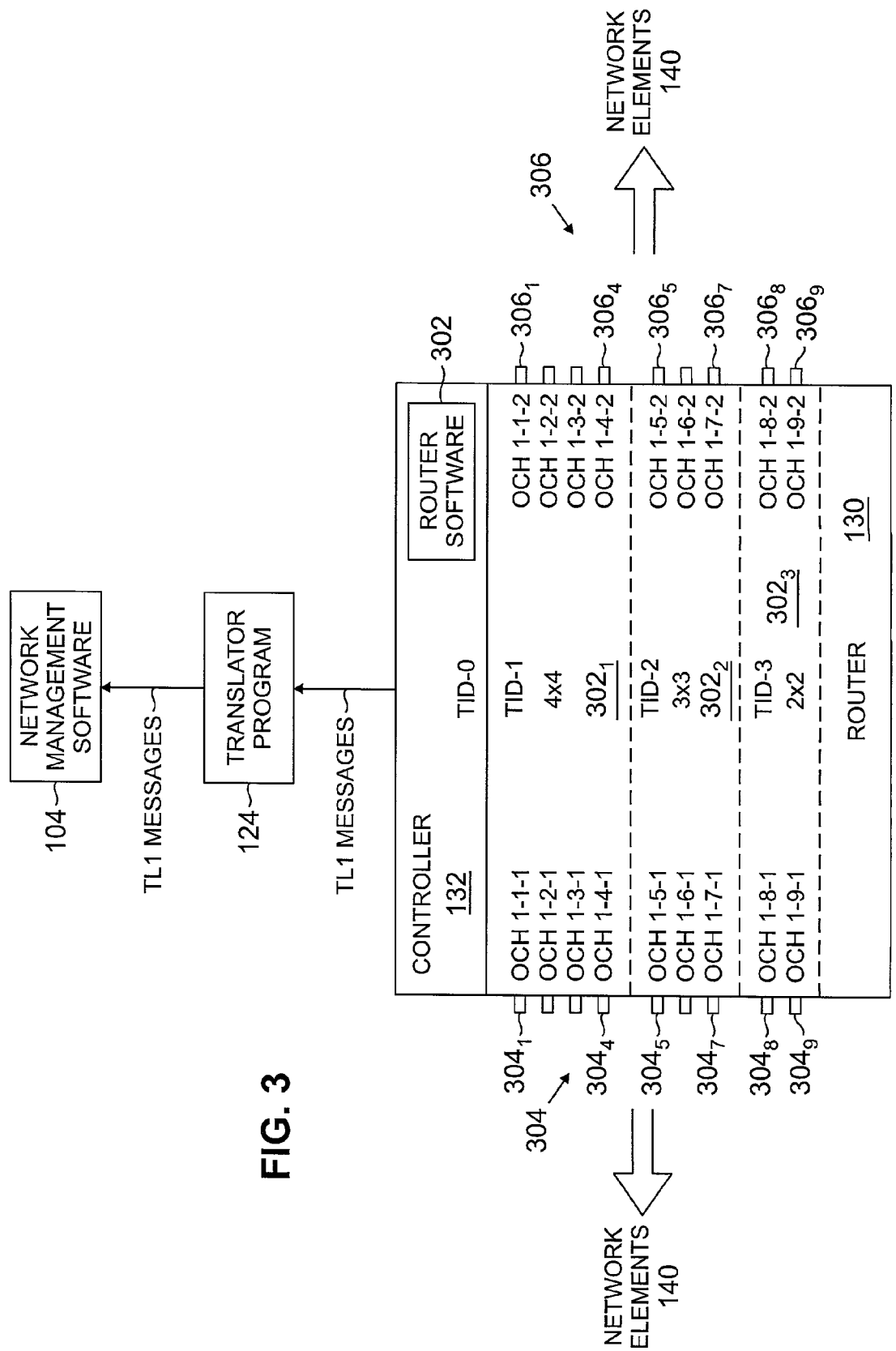

FIG. 3 depicts a block diagram of the router 130 of FIG. 1 suitable for use in the network. The optical router 130 physically comprises one or more shelves, each shelf having a plurality of slots, where each slot comprises at least one port. The network manager 104 communicates with the router software, via a TCP/IP (socket) connection transmitting machine-to machine program language, such as transaction language (TL1) messages. However, the present invention provides a translator program 124 to monitor and intercept the TL1 application messages exchanged between the network manager 104 and the router software 302.

One function of the translator program 124 is to logically divide or partition the single router 130 into a plurality of logical routers 302. In FIG. 3, the single router 130 is illustratively partitioned into three logical routers $302_1$ through $302_3$. Each logical router 302 comprises a plurality of optical channels (OCH), where a port defines each optical channel. In the exemplary embodiment of FIG. 3, the first logical router $302_1$ comprises four input optical channels $304_1$ through $304_4$ and four output optical channels $306_1$ through $306_4$. The second logical router $302_2$ comprises three input optical channels $304_5$ through $304_7$ and three output optical channels $306_5$ through $306_7$. Lastly, the third logical router $302_3$ illustratively comprises two input optical channels $304_8$ and $304_9$ and two output optical channels $306_8$ and $306_9$. Although only three logical routers $302_1$ through $302_3$ (and the respective input and output optical channels 304 and 306) are shown in FIG. 3, such number should not be considered as limiting.

Each port is provided with an access identification (AID) designation. For example, an AID designation of OCH 1_5_2 refers to the optical channel located at shelf 1, slot 5, and port 2, which also corresponds to logical partition TID-2 of the router in FIG. 3. FIG. 3 illustratively depicts a single shelf having at least nine slots. Each of the slots illustratively comprises two ports, which respectively define an input and output optical channel 304 and 306. As such, the exemplary router 130 depicted in FIG. 3 comprises a total of 18 ports and 18 respective AIDs. One skilled in the art will appreciate that the number of shelves, slots per shelf, and the number of ports per slot may vary. For example, Lucent Technology's LAMBDAROUTER™ All Optical Switch (e.g., AOS 128) comprises four ports per slot. Furthermore, the entire router is scalable, for example, from 128 ports to 256 ports, and to 1024 ports.

Once a system administrator (user) logically partitions the router 130, the network manager 104 interprets the single physical router 130 as being a plurality of independent routers. In the exemplary embodiment of FIG. 3, the network manager 104 "sees" three independent routers, while only one physical router 130 actually exists. Each logical partition 302 acts as an isolated switch serving the network elements 140 coupled to the associated ports of the respective optical channels 304 and 306 of each logical partition 302. As such, messages may only be transferred between the respective input optical channels 304 and output optical channels 306 of a particular logical partition 302. For example, network elements 140 coupled to the ports of input optical channels OCH_1_5_1 through OCH_1_7_1 $304_5$ to $304_7$ and the ports of the output optical channels OCH_1_5_2 through OCH_1_7_2 $306_5$ to $306_7$ of the second partition $302_2$, may only exchange information therebetween. That is, information traveling over optical channels from one partition may not be transferred to optical channels dedicated to another partition.

The invention contemplates assigning target identification numbers (TID) to each partition 302 in the router 130. For example, TID-1 represents the first logical partition $302_1$, TID-2 represents the second logical partition $302_2$, and TID-3 represents the third logical partition $302_3$. Thus, in the exemplary embodiment of FIG. 3, the network manager 104 sees three independent routers and is unaware that each TID represents a partition. Furthermore, the translator program 124 allows the router 130 to see only a single TID for itself (e.g., TID-0), and is unaware of being partitioned. The translator program 124 operates by remapping the TIDs of all TL1 messages sent between the network manager 104 and the router 130 as discussed below.

There are four types of transaction language (TL1) messages, which include input command messages, command response messages, acknowledgements, and autonomous messages. The input command messages are administrative commands generated by an administrator (user) of the network manager 104. The network manager 104 is illustratively utilized to establish a connection between two external nodes (i.e., network elements 140) coupled together through a router 130. Such input command messages include, but are not limited to, adding or deleting a session, an external node, a port, a router, a link (e.g., trail), a user, a user group, and/or the like. The most common command is to add/delete a session, which is a connection between two external nodes passing through the optical router 130. In order to add a new session, the user must provide a source node and port, a destination node and port, bandwidth supported by the session, direction (e.g., unidirectional or bi-directional), and a description of the session. The input command message is the only type message in the input command category, while the other three TL1 messages are directed to output or return commands.

The command response messages are generated in response to a command from the operating system or user. The command response messages provides a detailed reply or set of replies to an input command message, and contains information indicating whether the command was executed successfully and any data that needs to be returned to the network manager 104 or user. In one embodiment, the command response messages include responses such as COMPLD (completed) and DENY messages.

The acknowledgements may be considered as a subset of the command response messages. The acknowledgements originate from the network element 140 and are directed to the network manager 104 as a short reply from the network element 140 to indicate that an input command message is being acted upon or has been immediately rejected. The acknowledgement comprises an acknowledgement code, correlation tag (c-tag), and terminator. The acknowledgement code identifies the reason for the acknowledgement. The c-tag identifies the associated input command, and the terminator indicates the completion of the acknowledgement.

Autonomous messages are generated by the optical cross-connect network elements 140 and propagated towards the network manager 104, independent of the user input. The autonomous messages may be generated by a network element 140 on a periodic timed basis or to report some unusual occurrence (e.g., fault detection). Alternately, the optical router 130 may detect a weak signal from a network element 140, and generate a fault message (i.e., alarm message). The general structure of a TL1 autonomous message comprises a header, auto ID, text block, and terminator. The header represents information common to all output response and autonomous messages. The auto ID identifies the severity and the nature of the autonomous message via an alarm code. The optional text block represents specific information to the particular autonomous message, and the terminator indicates the completion or continuation of the autonomous message.

Figure 4:
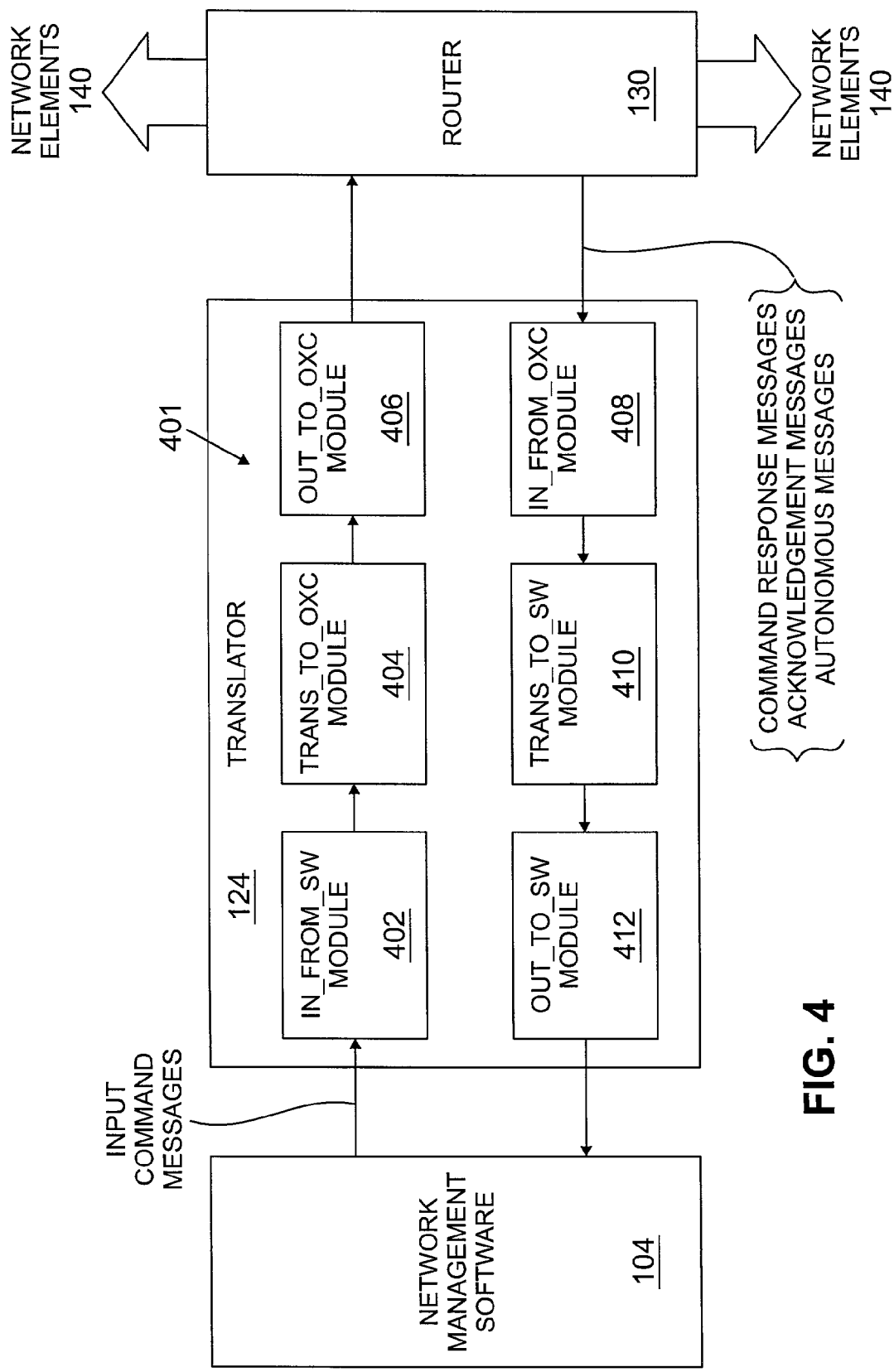

FIG. 4 depicts a block diagram of a plurality of program modules of a translator program of FIG. 3. In one embodiment, the translator program 124 is written using "C++" program language and comprises six program modules 401. One skilled in the art will appreciate that any other programming language may also be utilized. The exemplary program modules 401 include an in_from_sw module 402, a trans_to_OXC module 404, an out_to_OXC module 406, an in_from_OXC module 408, a trans_to_sw module 410, and an out_to_sw module 412. The in_from_sw module 402 monitors and intercepts the socket (e.g., Ethernet) connection from the network manager (e.g., SOFTWAVE) 104 to the host computer 120 of the translator 124 for TL1 messages generated by the user. In particular, the in_from_sw module 402 intercepts input command messages from the network manager 104.

The trans_to_OXC module 404 parses the TL1 messages (input command messages) passed thereto from the in_from_sw module 402 to change the logically partitioned TIDs (e.g., TID-2) to the physical TID (e.g., TID-0) recognized by the router 130. The out_to_OXC module 406 passes the altered TL1 message coming from the trans_to_OXC module 404 out of the socket of the host computer 120 to the router 130. These three modules 402, 404 and 406 form a command message path from the network manager 104 to the router 130. In an alternate embodiment, a single module may be used to provide the functionality of the in_from_sw module 402, the trans_to_OXC module 404, and the out_to_OXC module 406.

The in_from_OXC module 408 monitors and intercepts the socket (Ethernet) connection from the router 130 to the host computer 120 for TL1 messages generated by the network elements 140 for the network manager 104. In particular, the in_from_OXC module 408 intercepts acknowledgements, as well as command response messages coming from the router 130. Recall that command response messages are generated by the network elements 140 in response to an input command message from a user (e.g., COMPLD). Similarly, acknowledgements originate from the network element 140 and are directed to the operating system (i.e., network manager 104) as a short reply from the network element 140 to indicate that an input command message is being acted upon or has been immediately rejected. Furthermore, the in_from_OXC module 408 intercepts autonomous messages, which are generated by the network elements, independent of user input commands, as discussed with regard to FIG. 6 below.

The trans_to_sw module 410 parses the TL1 messages passed by the in_from_OXC module 408 and alters the router physical TID (e.g., TID-0) to a logical TID (e.g., TID-2) as recognized by the network manager 104. The trans_to_sw module 410 alters the TID in the message based on either the c-tag or access identification (AID), as discussed in further detail below. The out_to_sw module 412 passes the altered TL1 messages coming from the trans_to_sw module 410 to the network manager 124. These three modules 408, 410 and 412 form a return path from the router 130 to the network manager 104. In an alternate embodiment, a single module may be used to provide the functionality of the in_from_OXC module 408, the trans_to_sw module 410, and the out_to_sw module 412.

Figure 5:
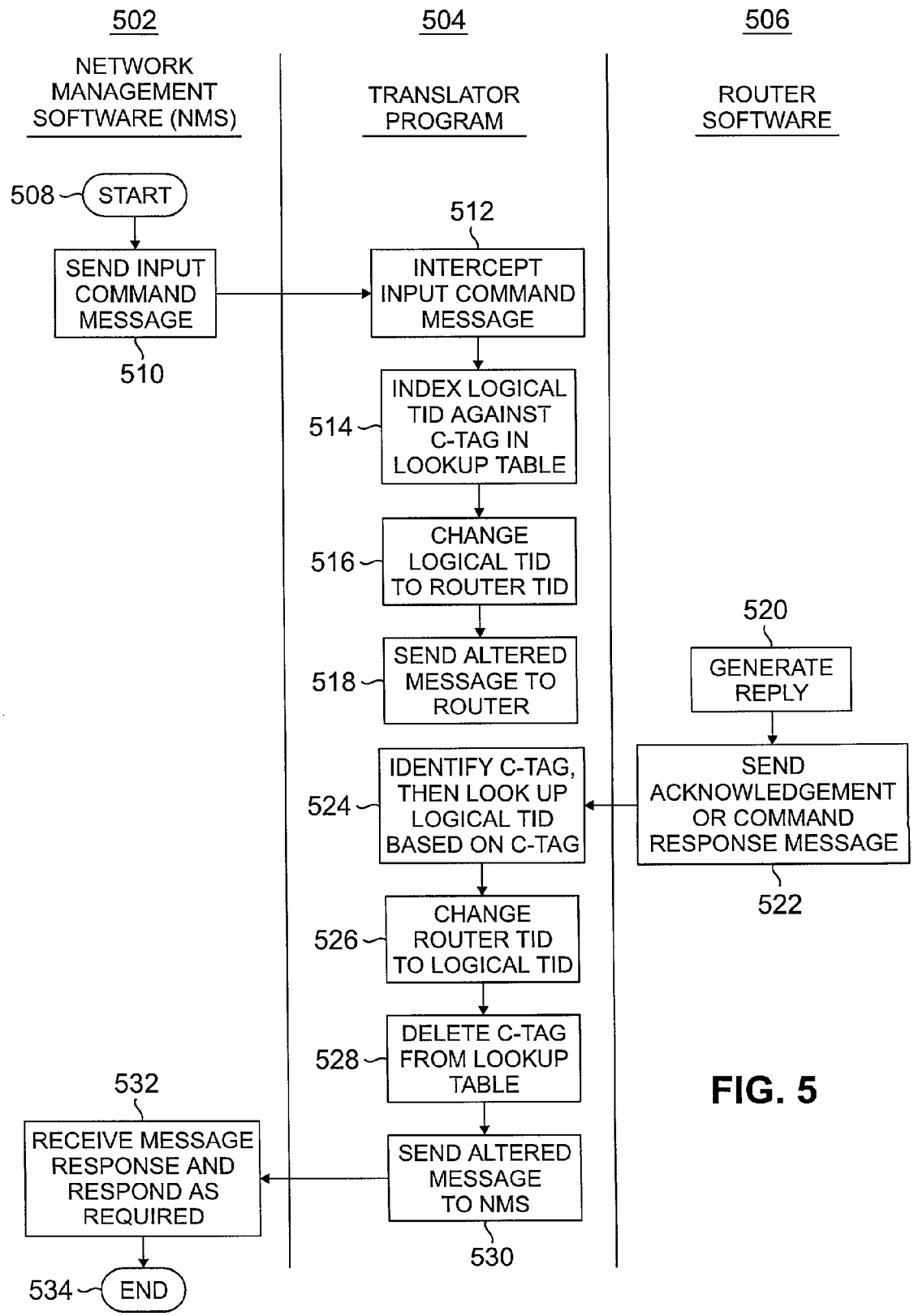

FIG. 5 depicts a flow diagram of a method 500 of exchanging and translating TL1 input command and return messages between a network manager 104 and a logically partitioned router 130 using a translator program 124. FIG. 5 is divided into three columns 502, 504, and 506. The first column 502 represents activity associated with the network manager 104. The second column 504 represents activity associated with the translator 124, and the third column 506 represents activity associated with the router 130 and/or network elements 140.

The method 500 starts at step 508 when, for example, an administrator (user) logs in to the network manager (e.g., WAVESTAR™) to initiate an input command message to, illustratively, add a session, which requires configuring the network. Control messages (i.e., TL-1 messages) are sent across a control and signaling network, which is distinct from the data network. That is, the data actually carried through the router 130 is typically end-user data, such as streaming video. Each input command message includes the command word, logical TID, and other modifiers.

For example, an input command message to log the network manager 104 into a network element 140 has a syntax "ACT-USER:tid:uid:ctag:pid;", where the modifiers tid is the logical target identification, uid is the user identifier, ctag is the correlation code that uniquely identifies every TL1 message sent from the network manager 104 to the router 130, and pid is the password identifier. Other input command messages include, but are not limited to, CANC-USER, which logs the network manager 104 off the network element 140; DLT-CRS, which deletes an existing cross connect in the network element; ENT-CRS, which creates a cross connection in the network element; and RTRV-CRS, which retrieves information on the existing cross connection; and RTRV-rr, which retrieves information on a specific optical port.

Once the input command message is sent to the router 130 at step 510, the method 500 proceeds to step 512, where the translator program 124 intercepts the input command message. In particular, the in_from_sw module 402 intercepts the input command message and sends it to the trans_to_OXC module 404. The trans_to_OXC module 404 parses the message to identify the logical TID and ctag of the intercepted message. The translator 124 comprises a mapping table (not shown), which correlates the logical TID's with the ctag of each message. At step 514, the translator program 124 writes (i.e., indexes) each logical TID with its associated ctag value into the mapping table. Thus, for each input command message, the table contains an index correlating the ctag and respective logical TID. The method 500 then proceeds to step 516.

At step 516, the translator program 124 changes the logical TID in the input command message to the TID of the router 130. Recall that the router TID (i.e., TID-0) always remains the same value. For example, if the input command message has a logical TID of TID-3, the translator program 124 changes the logical TID to TID-0, which signifies the unique target identifier of the optical router 130. The method 500 then proceeds to step 518, where the altered input command message is sent to the router 130. In particular, the out_to_OXC module 406 sends the altered message to the router 130.

The router software 302 then sends the command response message or acknowledgement (i.e., return message) back to the network manager 104. Specifically, at step 520, the router 130 generates either a command response message or acknowledgement, and at step 522, the router software 302 sends such generated return message back to the network manager 104, via the translator program 124. The command response message or acknowledgement includes the TID of the router (e.g., TID-0) plus a copy of the ctag value originally sent in the input command message. Recall that the ctag uniquely identifies every TL1 message sent from the network manager 104 to the router 130. That is, a-ctag is used to identify a particular input command message.

At step 524, the translator program 124 intercepts the command response message or acknowledgement sent to the network manager 104. Specifically, the in_from_OXC module 408 intercepts the return message and transfers the return message to the trans_to_sw module 410. At step 526, the translator program 124 changes the router TID (i.e., TID-0) in the return message back to the logical TID value (e.g., TID-3). Specifically, the translator program 124 uses the ctag in the return message to look up the logical TID in the mapping table corresponding to the input command message originally sent by the network manager 104. As such, the ctag is said to have a bi-directional flow, since it is attached to both the TL1 input command messages and return messages (i.e., acknowledgements and command response messages). The method 500 then proceeds to step 528.

At step 528, the ctag entry in the mapping table is permanently deleted. That is, since the return message (i.e., acknowledgement or command response message) to a particular input command message has been identified and sent back to the network manager 104, the ctag entry is no longer required. The method 500 then proceeds to step 530.

At step 530, the altered return message is sent back to the network manager 104. In particular, the out_to_sw module 412 transfers the altered message to the network manager 104. At step 532, the network manager 104 receives the return message having the logical TID, and responds as required or waits for a new input command message. The method 500 then proceeds to step 534, where the method 500 ends.

Figure 6:
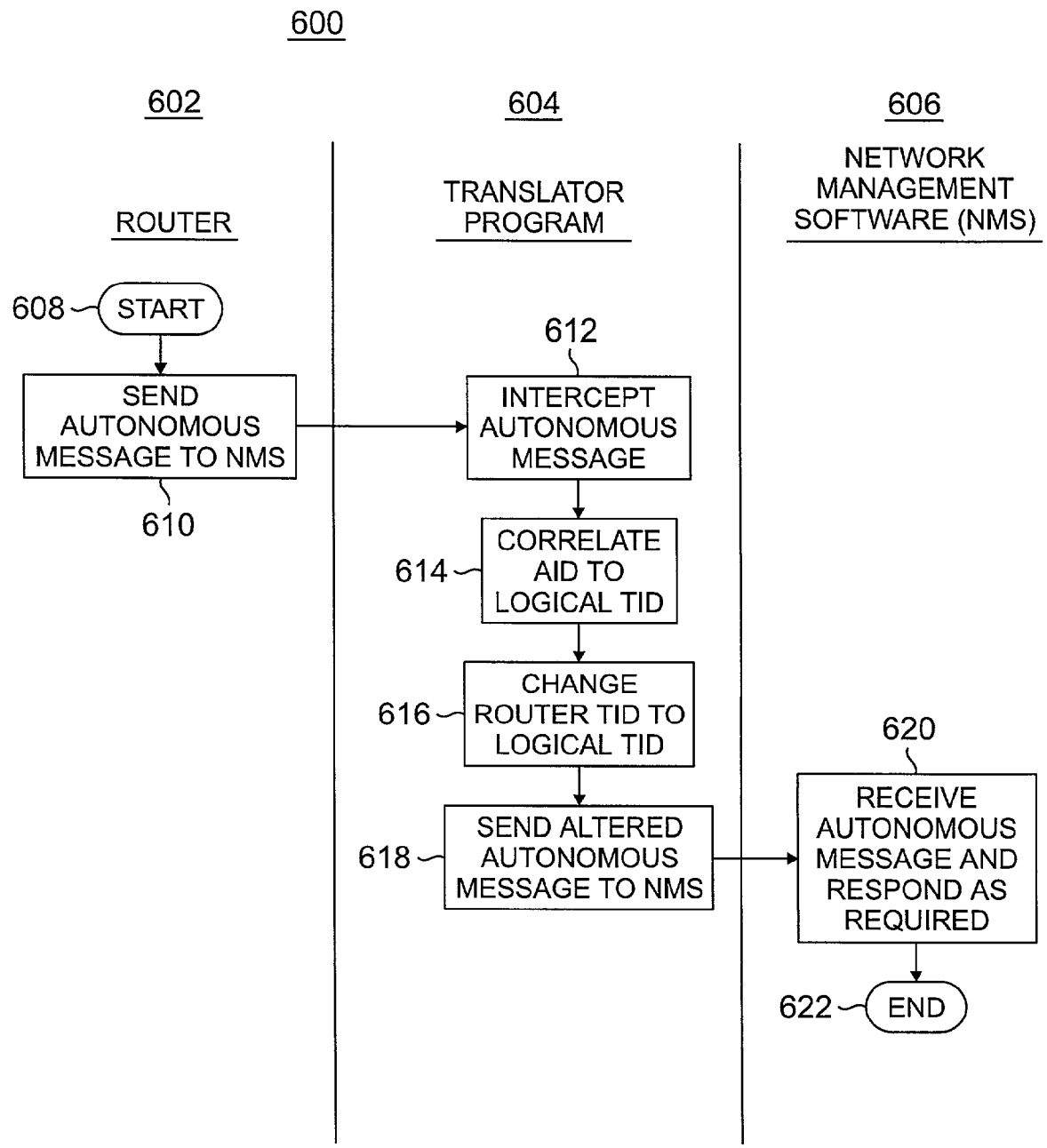

FIG. 6 depicts a flow diagram of a method 600 of exchanging and translating TL1 autonomous messages between the logically partitioned router 130 and network manager 104 via the translator program 124. FIG. 6 is divided into three columns 602, 604, and 606. The first column 602 represents activity associated with the router 130 and/or network elements 140. The second column 604 represents activity associated with the translator 124, and the third column 606 represents activity associated with the network manager 104.

The method 600 starts at step 608 and proceeds to step 610, where a network element 140 sends an autonomous message to the network manager 104. Recall, that autonomous messages are generated by the network element on a periodic timed basis or to report some unusual occurrence (e.g., fault detection). There is no ctag value associated with the autonomous references, since they do not originate from the network manager 104 as an input command message. Rather, each autonomous message contains an access identifier (AID), which identifies the optical channel 304 or 306 that the message is being sent. That is, each autonomous message contains the optical channel (OCH) values of the shelf, slot, and port of the router 130 for which the message is destined. Unlike the bi-direction ctag, the AID's have only a unidirectional flow path. That is, an AID is used only for messages going from a particular network element 140 to the network manager 104.

In one embodiment, one type of autonomous message is used to report an alarm condition of a network element 140 to the network manager 104. An exemplary syntax for an alarm code comprises the command "REPT-ALM" plus modifiers, such as source identification, date, time, alarm code, access identifier (AID), notification code, condition type, service effect, occurrence date and time, and the like. Similarly, a second type of autonomous message reports database changes to the network element. An exemplary syntax for a database change message comprises the command "REPT-DBCHG" plus modifiers, such as source identification, date, time, alarm code, access identifier (AID), and the like.

At step 612, the translator program 124 intercepts the autonomous message sent by the router 130 to the network manager 104. In particular, the in_from_OXC module 408 intercepts the autonomous message and transfers the autonomous message to the trans_to_sw module 410. At step 614, the translator program 124 uses the access identifier (AID) in the autonomous message to correlate the precise circuit pack (i.e., optical channel port) to the corresponding logical TID. In particular, the mapping table of the translator program 124 lists all of the optical channels and their respective ports, and also identifies each to an associated logical TID. For example, referring to FIG. 3, an autonomous message having an AID of OCH_1_8_1 is associated with the logical TID-3.

Once the translator program 124 associates the AID to the logical TID, the method 600 changes the TID in the autonomous message from router TID to the logical TID value (e.g., TID-0 to TID-2). The method 600 then proceeds to step 618, where the altered autonomous message is sent to the network manager 104. In particular, the out_to_sw module 412 of the translator 124 passes the altered TL1 autonomous message coming from the trans_to_sw module 410 to the network manager 124. At step 620, the network manager 104 receives the autonomous message and responds as required (e.g., notifies a user of an alarm condition). The method 600 then proceeds to step 622, where the method 600 ends.

The translator program 124 provides a reliable and inexpensive alternative to adding individual routers, which are costly to purchase and setup in a network as the network grows. The translator program 124 allows a network to be configured from a single location and to partition a single optical router into multiple logical switches. As network nodes 140 increase or decrease on different networks, the single logical router may be repartitioned to accommodate such changes. For example, if, in FIG. 3, the first logical partition $302_1$ had a decrease in network elements 140, while the third logical partition $302_3$ had an increase in network elements 140, then the router 130 may be repartitioned illustratively into three 3×3 partitions, instead of the current 4×4, 3×3, and 2×2 partitions, as illustratively shown.

Additionally, if a new network were to be added to the current network, additional circuit packs (i.e., optical channels) need only be added to the existing router 130, rather than having to purchase an entirely new router. That is, additional circuit packs may be inserted into open slots on the existing shelf. Alternately, the additional circuit packs may be inserted into another shelf (e.g., OCH 2_1_1–4 and OCH 2_2_1–4).

Although the teachings of the present invention that have been shown and described in detail herein, those skilled in the art can readily devise other varied embodiments that still incorporate the teachings and do not depart from the spirit of the invention.

The invention claimed is:

1. A method for translating control messages between a network manager and a router, the method comprising:
   sending air input command message from the network manager to the router, said input command message expressed in terms of a logical router partition;
   intercepting, at a host having a translator module, the input command message intended for said router, said router partitioned into a plurality of logical router partitions;
   translating the logical router partition expressed in said input command message into a physical router expression;
   altering the input command message thereby the logical router partition expression is changed to the physical router expression; and
   propagating said input command message, including any altered expressions, from the host toward said router.

2. The method of claim 1, wherein said step of translating comprises:
   translating a logical target identifier to a physical router target identifier.

3. The method of claim 2, wherein said intercepting step comprises:
   indexing said logical target identifier with an input correlation tag of said input command message.

4. The method of claim 1, further comprising:
   intercepting a return message from the router, said return message expressed in physical router terms;
   translating said physical router expression of said return message into a logical router partition and propagating said translated return message toward said network manager.

5. The method of claim 4, wherein said step of translating said physical router expression comprises:
translating a physical router target identifier to a logical target identifier.

6. The method of claim 5, further comprising determining said logical target identifier from a return correlation tag of said return message and an index, an input and the return correlation tags having a predetermined relationship.

7. The method of claim 4, wherein the return message comprises at least one of a command response message and an acknowledgment message.

8. The method of claim 1, further comprising:
intercepting an autonomous message from one of the network elements, said autonomous message expressed in terms of an access identifier;
matching the access identifier with an associated logical target identifier;
translating the physical router target identifier to the logical target identifier; and
propagating the translated autonomous message toward the network manager.

9. The method of claim 8, wherein the autonomous message comprises an alarm message.

10. A method for translating control messages between a network manager and a router, said router represented as a plurality of logical partitions, said method comprising:
intercepting, at a host having a translator module, an input transaction language (TL1) message from the network manager intended for the router, wherein the first TL1 message is expressed with a logical target identifier;
translating the logical target identifier of the intercepted input TL1 message to a physical router target identifier;
altering the TL1 thereby the logical target identifier is changed to the physical router target identifier; and
propagating the translated TL1 message, including any altered expressions, from the host toward the router.

11. The method of claim 10, wherein said intercepting step further comprises:
indexing said logical target identifier with an input correlation tag of said input TL1 message.

12. The method of claim 11, father comprising:
intercepting a return transaction language (TL1) message from the router to the network manager, wherein the return TL1 message is expressed with a physical router target identifier;
translating the physical router target identifier of the intercepted return TL1 message to a logical target identifier; and
propagating the TL1 message, including any translated expressions, toward the router.

13. The method of claim 12, further comprising determining said logical target identifier from a return correlation tag of said return message and said index, wherein said input and return correlation tags are equivalent.

14. The method of claim 13, wherein the return TL1 message comprises at least one of a command response message and an acknowledgement message.

15. The method of claim 10, further comprising:
intercepting an autonomous TL1 message from one of the network elements, said autonomous TL1 message expressed in terms of an access identifier;
matching the access identifier with an associated logical target identifier;
translating the physical router target identifier to the logical target identifier; and
propagating the autonomous message, including any translated expressions, toward the network manager.

16. The method of claim 15, wherein the autonomous TL1 message comprises an alarm message.

17. Apparatus for routing control messages between a network manager and a router, comprising:
means for intercepting, at a host having a translator module, an input command message intended for said router, said router partitioned into a plurality of logical router partitions, said input command message expressed in terms of a logical router partition;
means for translating each logical router partition expressed in said input command message into a physical router expression;
means for altering the input command message thereby the logical router partition expression is changed to the physical router expression; and
means for propagating the input command message, including any altered expressions, from the host toward the router.

18. The apparatus of claim 17, wherein said translating means comprises:
translating a logical target identifier to a physical router target identifier.

19. The apparatus of claim 18, wherein said intercepting step comprises:
means for indexing said logical target identifier with an input correlation tag of said input command message.

20. The apparatus of claim 19, further comprising:
means for intercepting a return message from the router, said return message expressed in physical router terms;
means for translating said physical router expression of said return message into a logical router partition; and
means for propagating said return message, including any translated expressions, toward said network manager.

* * * * *